US012289212B2

(12) United States Patent
Sethi et al.

(10) Patent No.: US 12,289,212 B2
(45) Date of Patent: Apr. 29, 2025

(54) EDGE COMPUTING DEPLOYMENT BASED ON ARTIFICIAL INTELLIGENCE-DRIVEN TOPOLOGY CONSTRUCTION FROM PLAIN TEXT INPUT

(71) Applicant: Dell Products L.P., Round Rock, TX (US)

(72) Inventors: Parminder Singh Sethi, Ludhiana (IN); Shree Rathinasamy, Round Rock, TX (US); Philip Sheaff, Asheville, NC (US); Praveen Kumar, Noida (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/471,412

(22) Filed: Sep. 21, 2023

(65) Prior Publication Data

US 2025/0106112 A1 Mar. 27, 2025

(51) Int. Cl.
*H04L 41/12* (2022.01)
*H04L 41/084* (2022.01)

(52) U.S. Cl.
CPC ............ *H04L 41/12* (2013.01); *H04L 41/084* (2013.01)

(58) Field of Classification Search
CPC .............................. H04L 41/12; H04L 41/084
See application file for complete search history.

(56) References Cited

U.S. PATENT DOCUMENTS

| 11,272,031 B2 | 3/2022 | Sethi et al. | |
| 2015/0195768 A1* | 7/2015 | Abraham | H04L 67/51 370/254 |
| 2018/0025083 A1* | 1/2018 | Agarwal | G06F 16/951 707/706 |
| 2020/0379673 A1 | 12/2020 | Le Gallo-Bourdeau et al. | |
| 2021/0099457 A1* | 4/2021 | Guo | H04L 67/306 |
| 2021/0352159 A1* | 11/2021 | Sethi | H04L 67/34 |
| 2024/0296178 A1* | 9/2024 | Jia | G06F 16/3329 |

FOREIGN PATENT DOCUMENTS

WO 2019149207 A1 8/2019

OTHER PUBLICATIONS

A. Yanpi et al., "A Large-Margin Approach for Multi-Label Classification Based on Correlation Between Labels," 2019 5th Conference on Knowledge Based Engineering and Innovation (KBEI), Tehran, Iran, 2019, pp. 713-716.

X. Wang et al., "STS-NLSP: A Network-Based Label Space Partition Method for Predicting the Specificity of Membrane Transporter Substrates Using a Hybrid Feature of Structural and Semantic Similarity," Frontiers in Bioengineering and Biotechnology, Nov. 6, 2019, vol. 7, Article 306, 13 pages.

* cited by examiner

*Primary Examiner* — Chris Parry
*Assistant Examiner* — Steven C Nguyen
(74) *Attorney, Agent, or Firm* — Ryan, Mason & Lewis, LLP (57) ABSTRACT

Illustrative embodiments provide techniques for edge computing management. For example, a processing platform is configured to obtain a plain text input specifying a set of devices for an edge computing network to be deployed and construct a topology diagram corresponding to the set of devices configured based on a set of configuration subprofiles. The processing platform is further configured to cause deployment of the edge computing network based on the topology diagram.

20 Claims, 8 Drawing Sheets

```
"ansible_net_gather_subset": [
    "hardware",
    "default",
    "interfaces"
],
"ansible_net_hostname": "sonic-switch1",
"ansible_net_model": "sonic_model",
"ansible_net_serialnum": "ABC123456789",
"ansible_net_version": "2023.1",
"ansible_net_image": "/user/lib/sonic/bin/sonic.bin",
"ansible_net_interfaces": {
    "Ethernet0": {
        "macaddress": "aa:bb:cc:dd:ee:ff",
        "description": "Connection to Router",
        "type": "Ethernet",
        "bandwidth": "10000",
        "mtu": "1500",
        "status": "up",
        "ipv4": "192.168.0.1",
        "ipv6": "2001:0db8:85a3:0000:0000:8a2e:0370:7334"
    },
```

— COMPONENT

ATTRIBUTES

- 902 — OBTAIN A PLAIN TEXT INPUT SPECIFYING A SET OF DEVICES FOR AN EDGE COMPUTING NETWORK TO BE DEPLOYED
- 904 — OBTAIN A SET OF PROFILES, BASED ON THE PLAIN TEXT INPUT, FOR USE IN CONFIGURING THE SET OF DEVICES WHEREIN, FOR A GIVEN DEVICE, A GIVEN PROFILE COMPRISES ONE OR MORE CONFIGURATION ATTRIBUTE VALUES CORRESPONDING TO ONE OR MORE COMPONENTS OF THE GIVEN DEVICE
- 906 — DIVIDE EACH OF AT LEAST A PORTION OF THE PROFILES OF THE SET OF PROFILES INTO TWO OR MORE SUB-PROFILES TO FORM A SET OF SUB-PROFILES WHEREIN, FOR A GIVEN DIVIDED PROFILE OF A GIVEN DEVICE, TWO OR MORE SUB-PROFILES RESPECTIVELY CORRESPOND TO TWO OR MORE COMPONENTS OF THE GIVEN DEVICE
- 908 — STORE THE SET OF SUB-PROFILES FOR USE IN CONFIGURING ONE OR MORE OTHER DEVICES IN THE SET OF DEVICES
- 910 — CONSTRUCT A TOPOLOGY DIAGRAM CORRESPONDING TO THE SET OF DEVICES CONFIGURED BASED ON THE SET OF SUB-PROFILES
- 912 — CAUSE DEPLOYMENT OF THE EDGE COMPUTING NETWORK BASED ON THE TOPOLOGY DIAGRAM

FIG. 10

EDGE COMPUTING DEPLOYMENT BASED ON ARTIFICIAL INTELLIGENCE-DRIVEN TOPOLOGY CONSTRUCTION FROM PLAIN TEXT INPUT

FIELD

The field relates generally to information processing systems, and more particularly to management of information processing systems comprising edge computing networks.

BACKGROUND

Edge computing environments are becoming increasingly complex due to the sheer number of devices such as sensors, appliances, robots, machines, devices, etc. In addition, there are added intricacies introduced with network considerations, policy determination, load balancing and bandwidth management for an efficient edge network design. It takes time for network solution architects (NSA) to manually design and create network topologies for edge environments based on the requirements stated by their customers. As needs increase, the edge landscape also expands, leading to further proliferation of devices and adding more complexity to the existing network.

SUMMARY

Illustrative embodiments provide techniques for edge computing management in information processing systems.

For example, in one illustrative embodiment, a processing platform comprises at least one processor coupled to at least one memory, and is configured to obtain a plain text input specifying a set of devices for an edge computing network to be deployed. The processing platform is further configured to obtain a set of profiles, based on the plain text input, for use in configuring the set of devices wherein, for a given device, a given profile comprises one or more configuration attribute values corresponding to one or more components of the given device. The processing platform is further configured to divide each of at least a portion of the profiles of the set of profiles into two or more sub-profiles to form a set of sub-profiles wherein, for a given divided profile of a given device, two or more sub-profiles respectively correspond to two or more components of the given device. The processing platform is further configured to store the set of sub-profiles for use in configuring one or more other devices in the set of devices. The processing platform is further configured to construct a topology diagram corresponding to the set of devices configured based on the set of sub-profiles. The processing platform is further configured to cause deployment of the edge computing network based on the topology diagram.

Further illustrative embodiments are provided in the form of a non-transitory computer-readable storage medium having embodied therein executable program code that when executed by at least one processor causes the at least one processor to perform the above-mentioned operations. Still further illustrative embodiments comprise methodologies performed by a processing platform comprising at least one processor coupled to at least one memory.

Advantageously, illustrative embodiments provide efficient solutions that overcome technical challenges of network design and mapping of topology to provide effective results for users in view of their edge computing specifications.

These and other features and advantages of embodiments described herein will become more apparent from the accompanying drawings and the following detailed description.

DETAILED DESCRIPTION

Illustrative embodiments will be described herein with reference to exemplary information processing systems and associated host devices, storage devices, network devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising edge and cloud computing environments, as well as other types of processing systems comprising various combinations of physical and virtual processing resources. An information processing system may therefore comprise, for example, at least one data center or other cloud-based system that includes one or more clouds, e.g., multi-cloud computing network, hosting multiple tenants that share cloud resources, as well as one or more edge computing networks as will be further explained. Numerous different types of enterprise computing and storage systems are also encompassed by the term "information processing system" as that term is broadly used herein.

As mentioned above, edge computing environments are becoming increasingly complex due to the sheer number of devices such as sensors, appliances, robots, machines, devices, etc., as well as added intricacies introduced with network considerations, policy determination, load balancing and bandwidth management for an efficient edge network design.

Illustrative embodiments address the above and other technical challenges with respect to design and deployment of an edge computing environment by providing edge computing management functionalities that efficiently map out a network topology for the edge environment using one or more artificial intelligence/machine learning (AI/ML) algorithms based on simple plain text inputs. More particularly, by leveraging capabilities of AI/ML, edge computing management functionalities according to illustrative embodiments enable users to describe their needed/desired network topology using plain language, and an edge topology construction engine then generates a topology diagram which is fed to a deployment engine for causing physical manifestation of the network topology as an edge computing network.

Figure 1:
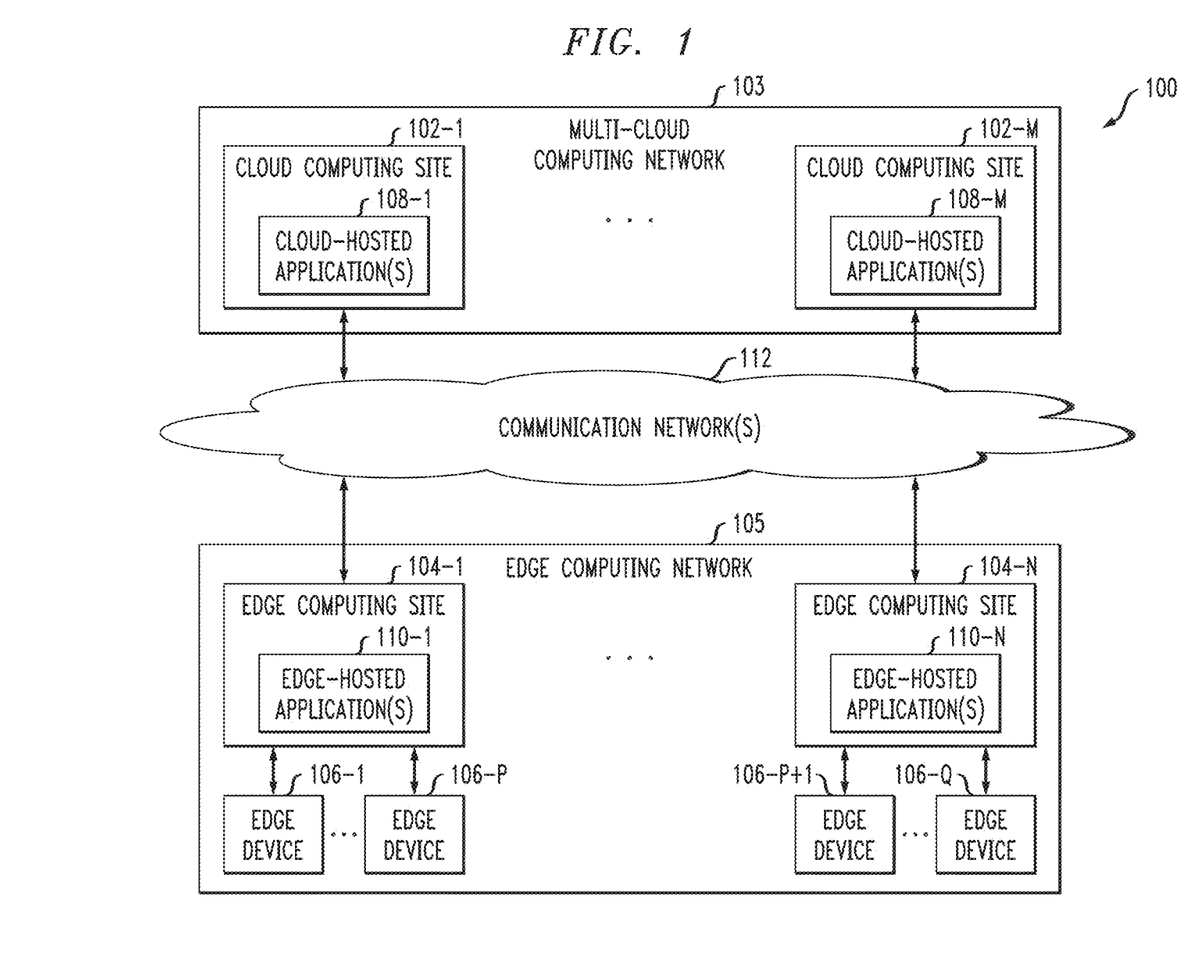
FIG. 1 illustrates an information processing system environment configured with an edge computing network deployed via edge computing management functionalities according to an illustrative embodiment.

By way of example only, FIG. 1 illustrates an information processing system environment 100 configured with an edge computing network which can be deployed via edge computing management functionalities according to an illustrative embodiment. The information processing system environment 100 is illustratively assumed to be implemented across multiple processing platforms as will be further described below.

The information processing system environment 100 comprises a set of cloud computing sites 102-1, . . . 102-M (collectively, cloud computing sites 102) that collectively comprise a multi-cloud computing network 103. Information processing system environment 100 also comprises a set of edge computing sites 104-1, . . . 104-N (collectively, edge computing sites 104, also referred to as edge computing nodes or edge servers) that collectively comprise at least a portion of an edge computing network 105. The cloud computing sites 102, also referred to as cloud data centers, are assumed to comprise a plurality of cloud devices or cloud nodes (not shown in FIG. 1) that run sets of cloud-hosted applications 108-1, . . . 108-M (collectively, cloud-hosted applications 108). Each of the edge computing sites 104 is assumed to comprise compute infrastructure or edge assets (not shown in FIG. 1) that run sets of edge-hosted applications 110-1, . . . 110-N (collectively, edge-hosted applications 110). As used herein, the term "application" is intended to be broadly construed to include applications, microservices, and other types of services.

Information processing system environment 100 also includes a plurality of edge devices that are coupled to each of the edge computing sites 104 as part of edge computing network 105. A set of edge devices 106-1, . . . 106-P are coupled to edge computing site 104-1, and a set of edge devices 106-P+1, . . . 106-Q are coupled to edge computing site 104-N. The edge devices 106-1, . . . 106-Q are collectively referred to as edge devices 106. Edge devices 106 may comprise, for example, physical computing devices such as Internet of Things (IoT) devices, sensor devices (e.g., for telemetry measurements, videos, images, etc.), mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The edge devices 106 may also or alternately comprise virtualized computing resources, such as virtual machines (VMs), containers, etc. In this illustration, the edge devices 106 may be tightly coupled or loosely coupled with other devices, such as one or more input sensors and/or output instruments (not shown). Couplings can take many forms, including but not limited to using intermediate networks, interfacing equipment, connections, etc.

Edge devices 106 in some embodiments comprise respective computers associated with a particular company, organization or other enterprise. In addition, at least portions of information processing system environment 100 may also be referred to herein as collectively comprising an "enterprise." Numerous other operating scenarios involving a wide variety of different types and arrangements of processing nodes are possible, as will be appreciated by those skilled in the art.

Note that the number of different components referred to in FIG. 1, e.g., M, N, P, Q, can each be different numbers or some of them the same numbers. Embodiments illustrated herein are not intended to be limited to any particular numbers of components.

As shown in FIG. 1, edge computing sites 104 are connected to cloud computing sites 102 via one or more communication networks 112 (also referred to herein as networks 112). Although not explicitly shown, edge devices 106 may be coupled to the edge computing sites 104 via networks 112. Networks 112 coupling the cloud computing sites 102, edge computing sites 104 and edge devices 106 are assumed to comprise a global computer network such as the Internet, although other types of private and public networks can be used, including a wide area network (WAN), a local area network (LAN), a satellite network, a telephone or cable network, a cellular network, a wireless network such as a WiFi or WiMAX network, or various portions or combinations of these and other types of networks. In some embodiments, a first type of network couples edge devices 106 to edge computing sites 104, while a second type of network couples the edge computing sites 104 to the cloud computing sites 102. Various other examples are possible.

In some embodiments, one or more of cloud computing sites 102 and one or more of edge computing sites 104 collectively provide at least a portion of an information technology (IT) infrastructure operated by an enterprise, where edge devices 106 are operated by users of the enterprise. The IT infrastructure comprising cloud computing sites 102 and edge computing sites 104 may therefore be referred to as an enterprise system. As used herein, the term "enterprise system" is intended to be construed broadly to include any group of systems or other computing devices. In some embodiments, an enterprise system includes cloud infrastructure comprising one or more clouds (e.g., one or more public clouds, one or more private clouds, one or more hybrid clouds, combinations thereof, etc.). The cloud infrastructure may host at least a portion of one or more of cloud computing sites 102 and/or one or more of the edge computing sites 104. A given enterprise system may host assets that are associated with multiple enterprises (e.g., two or more different businesses, organizations or other entities). In another example embodiment, one or more of the edge computing sites 104 may be operated by enterprises that are separate from, but communicate with, enterprises which operate one or more cloud computing sites 102.

Although not explicitly shown in FIG. 1, one or more input-output devices such as keyboards, displays or other types of input-output devices may be used to support one or more user interfaces to each of cloud computing sites 102, edge computing sites 104 and edge devices 106, as well as to support communication between each of cloud computing sites 102, edge computing sites 104, edge devices 106, and other related systems and devices not explicitly shown.

As noted above, cloud computing sites 102 host cloud-hosted applications 108 and edge computing sites 104 host edge-hosted applications 110. Edge devices 106 may exchange information with cloud-hosted applications 108 and/or edge-hosted applications 110. For example, edge devices 106 or edge-hosted applications 110 may send information to cloud-hosted applications 108. Edge devices 106 or edge-hosted applications 110 may also receive information (e.g., such as instructions) from cloud-hosted applications 108.

It should be noted that, in some embodiments, requests and responses or other information may be routed through multiple edge computing sites. While FIG. 1 shows an embodiment where each edge computing site 104 is connected to cloud computing sites 102 via the networks 112, this is not a requirement. In other embodiments, one or more of edge computing sites 104 may be connected to one or more of cloud computing sites 102 via one or more other ones of edge computing sites 104 (e.g., edge computing sites 104 may be arranged in a hierarchy with multiple levels, possibly including one or more edge data centers that couple edge computing sites 104 with cloud computing sites 102).

It is to be appreciated that multi-cloud computing network 103, edge computing network 105, and edge devices 106 may be collectively and illustratively referred to herein as a "multi-cloud edge platform." In some embodiments, edge computing network 105 and edge devices 106 are considered a "distributed edge system."

In some embodiments, edge data from edge devices 106 may be stored in a database or other data store (not shown), either locally at edge computing sites 104 and/or in a processed or transformed format at different endpoints (e.g., cloud computing sites 102, edge computing sites 104, other ones of edge devices 106, etc.). The database or other data store may be implemented using one or more storage systems that are part of or otherwise associated with one or more of cloud computing sites 102, edge computing sites 104, and edge devices 106. By way of example only, the storage systems may comprise a scale-out all-flash content addressable storage array or other type of storage array. The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Cloud computing sites 102, edge computing sites 104, and edge devices 106 in the FIG. 1 embodiment are assumed to be implemented using processing devices, wherein each such processing device generally comprises at least one processor and an associated memory.

It is to be appreciated that the particular arrangement of cloud computing sites 102, edge computing sites 104, edge devices 106, cloud-hosted applications 108, edge-hosted applications 110, and communications networks 112 illustrated in the FIG. 1 embodiment is presented by way of example only, and alternative arrangements can be used in other embodiments.

It is to be understood that the particular set of components shown in FIG. 1 is presented by way of illustrative example only, and in other embodiments additional or alternative components may be used. Thus, another embodiment may include additional or alternative systems, devices and other network entities, as well as different arrangements of modules and other components.

Cloud computing sites 102, edge computing sites 104, edge devices 106, and other components of the information processing system environment 100 in the FIG. 1 embodiment are assumed to be implemented using one or more processing platforms each comprising one or more processing devices having a processor coupled to a memory. Such processing devices can illustratively include particular arrangements of compute, storage, and network resources.

Cloud computing sites 102, edge computing sites 104, edge devices 106, or components thereof, may be implemented on respective distinct processing platforms, although numerous other arrangements are possible. For example, in some embodiments at least portions of edge devices 106, and edge computing sites 104 may be implemented on the same processing platform. One or more of edge devices 106 can therefore be implemented at least in part within at least one processing platform that implements at least a portion of edge computing sites 104. In other embodiments, one or more of edge devices 106 may be separated from but coupled to one or more of edge computing sites 104. Various other component coupling arrangements are contemplated herein.

The term "processing platform" as used herein is intended to be broadly construed so as to encompass, by way of illustration and without limitation, multiple sets of processing devices and associated storage systems that are configured to communicate over one or more networks. For example, distributed implementations of information processing system environment 100 are possible, in which certain components of the system reside in one data center in a first geographic location while other components of the system reside in one or more other data centers in one or more other geographic locations that are potentially remote from the first geographic location. Thus, it is possible in some implementations of the system for cloud computing sites 102, edge computing sites 104, and edge devices 106, or portions or components thereof, to reside in different data centers. Distribution as used herein may also refer to functional or logical distribution rather than to only geographic or physical distribution. Numerous other distributed implementations are possible.

In some embodiments, information processing system environment 100 may be implemented in part or in whole using a Kubernetes container orchestration system. Kubernetes is an open-source system for automating application deployment, scaling, and management within a container-based information processing system comprised of components referred to as pods, nodes and clusters. Types of containers that may be implemented or otherwise adapted within the Kubernetes system include, but are not limited to, Docker containers or other types of Linux containers (LXCs) or Windows containers.

In general, for a Kubernetes environment, one or more containers are part of a pod. Thus, the environment may be referred to, more generally, as a pod-based system, a pod-based container system, a pod-based container orchestration system, a pod-based container management system, or the like. As mentioned above, the containers can be any type of container, e.g., Docker container, etc. Furthermore, a pod is typically considered the smallest execution unit in the Kubernetes container orchestration environment. A pod encapsulates one or more containers. One or more pods are executed on a worker node. Multiple worker nodes form a cluster. A Kubernetes cluster is managed by at least one manager node. A Kubernetes environment may include multiple clusters respectively managed by multiple manager nodes. Furthermore, pods typically represent the respective processes running on a cluster. A pod may be configured as a single process wherein one or more containers execute one or more functions that operate together to implement the process. Pods may each have a unique Internet Protocol (IP) address enabling pods to communicate with one another, and for other system components to communicate with each pod. Still further, pods may each have persistent storage volumes associated therewith. Configuration information (configuration objects) indicating how a container executes can be specified for each pod. It is to be appreciated, however, that embodiments are not limited to Kubernetes container orchestration techniques or the like.

Kubernetes has become the prevalent container orchestration system for managing containerized workloads and has been adopted by many enterprise-based IT organizations to deploy its application programs (applications) and edge computing networks. While the Kubernetes container orchestration system is mentioned as an illustrative implementation, it is to be understood that alternative deployment systems, as well as information processing systems other than container-based systems, can be utilized.

It is to be further appreciated that illustrative embodiments are not limited to the FIG. 1 embodiment or any particular edge computing implementation but rather can be implemented with any information processing system environment that would benefit from efficient design and deployment functionalities described herein.

Figure 2:
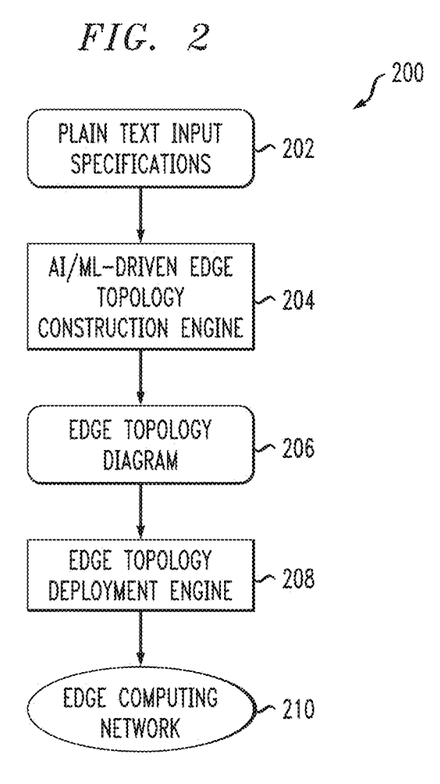
FIG. 2 illustrates an edge computing management system according to an illustrative embodiment.

Referring now to FIG. 2, an edge computing management system 200 according to an illustrative embodiment is illustrated. More particularly, as shown, a plain text input specification 202 (e.g., edge computing network configuration needs/wants of a customer) is provided to an AI/ML-driven edge topology construction engine 204. AI/ML-driven edge topology construction engine 204, as will be explained in detail below in the context of FIGS. 3-8, generates an edge topology diagram 206 based on plain text input specification 202. Edge topology diagram 206 is provided to an edge topology deployment engine 208 which then causes physical manifestation (e.g., actual deployment in the field) of an edge computing network 210 embodied by edge topology diagram 206. By way of example only, edge computing network 105 in FIG. 1 is an example of deployed edge computing network 210.

Figure 3:
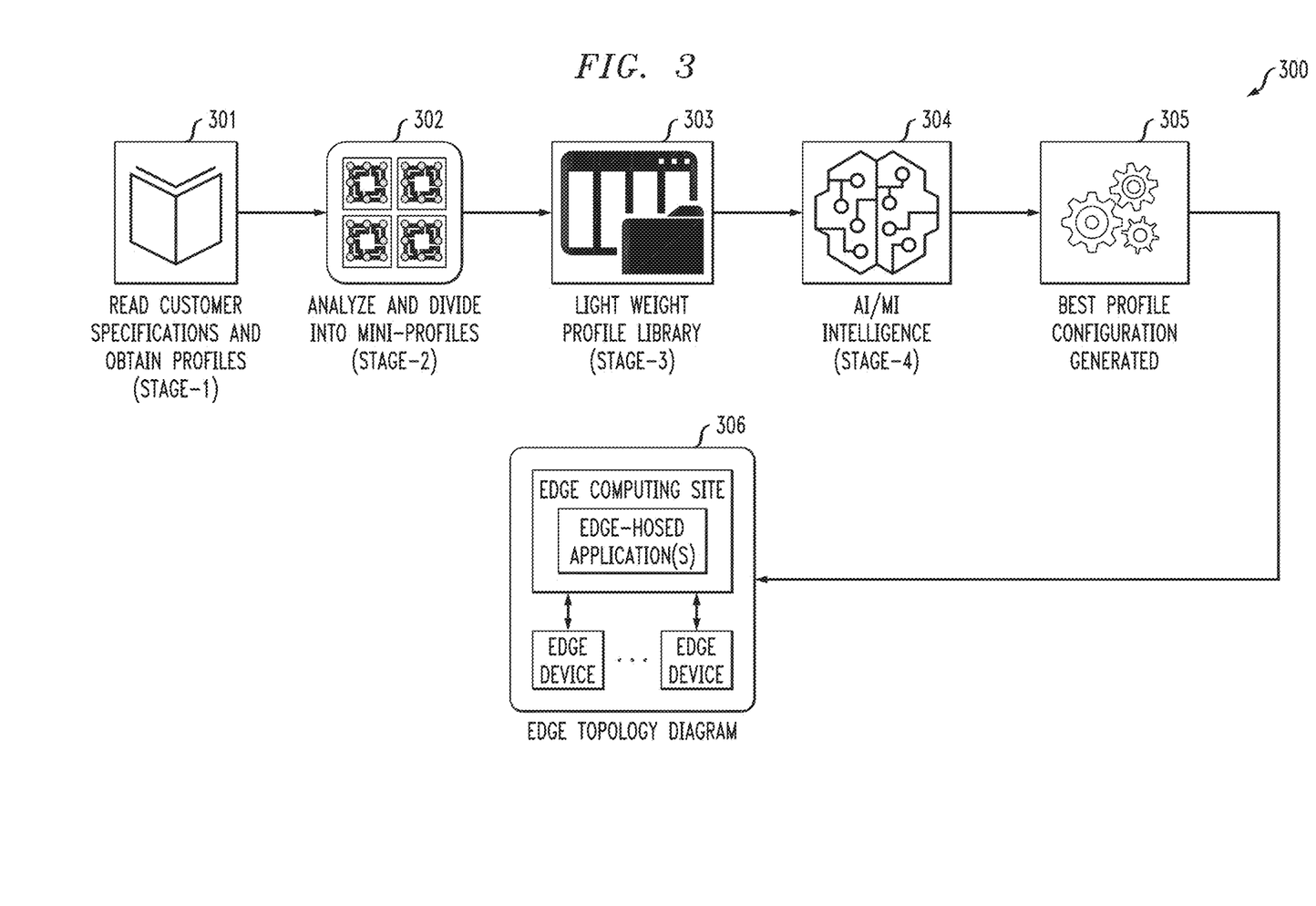
FIG. 3 illustrates a multi-stage workflow for edge computing management according to an illustrative embodiment.

FIG. 3 illustrates a workflow 300 for edge computing management according to an illustrative embodiment. It is to be appreciated that workflow 300 can be considered an exemplary embodiment of an implementation of operations executed by AI/ML-driven edge topology construction engine 204 of FIG. 2.

More particularly, workflow 300 illustrates four main stages of an edge computing management workflow. Further details of each stage will be further described in accordance with subsequent figures. It is to be understood that while workflow 300 depicts four main stages and certain illustrative implementation details for certain edge devices, alternative embodiments are not limited to any specific number of stages, any specific implementation details or any specific devices but are more generally applicable to any information processing system that would benefit from improved edge computing management techniques described herein. The main stages of workflow 300 are as follows.

Step 301 (Stage-1). As shown in the workflow 300, customer specifications are input (read) in plain language text and profiles are obtained from the specification. By way of example only, assume the following customer specification is read: "Design a network topology using four edge compute servers XR11 for a cluster, a second cluster with four edge compute servers XE2420, connected by a network fabric using N3248PXE network switches running SONiC NOS, which connects to Dell SD-WAN device."

It is to be understood that computing devices each have many hardware, software and/or firmware components, by way of example only, a central processing unit (CPU), a hard disk drive, a cooling fan, a power supply, a basic input/output system (BIOS), etc. Each of these components has various configurable attributes which impact device and application performance. Administrators typically have to understand each attribute and select the appropriate value for the appropriate application/workload. Profiling techniques are typically used to generate a configuration profile (profile) for each device wherein the profile contains values of all of the attributes of the device components. In a computing environment that employs profiling, administrators configure large sets of devices by importing the profiles from the device itself and/or from a profile repository. The configured profiles can then be stored back in the profile repository.

Figure 4:
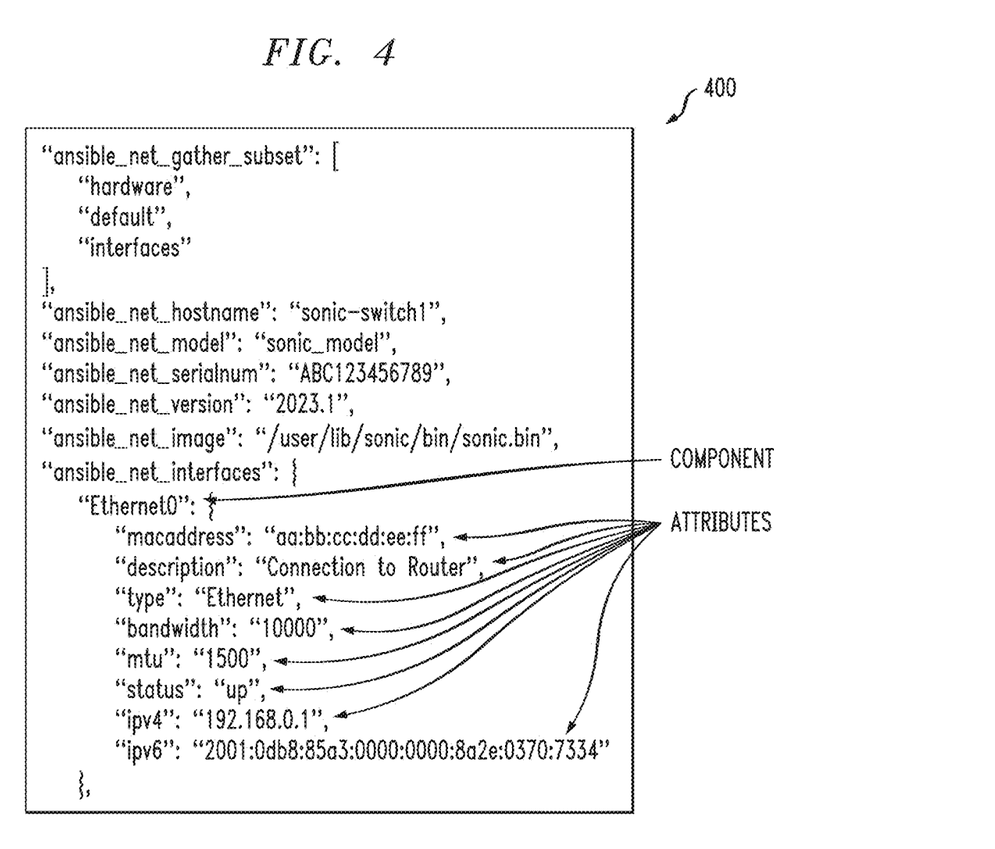
FIG. 4 illustrates an example of a profile according to an illustrative embodiment.

Thus, for a given customer specification received by workflow 300, such as the exemplary one recited above, step 301 converts the plain text of the customer specification into profiles by obtaining all available profiles of edge and other devices referenced in the customer specification from a profile repository. FIG. 4 illustrates an example of a server profile 400 (e.g., an device such as an edge compute server) in a JavaScript Object Notation (JSON) format with different configurable/reconfigurable components and corresponding attributes associated with the server. By way of example only, server profile 400 may contain configuration settings of network interface controllers and event filters associated with the server.

Step 302 (Stage-2): As explained, each profile comprises different components of the device for which the profile applies. In accordance with illustrative embodiments using a multi-label classification algorithm based on correlation between labels as will be further explained below, each of one or more of the profiles is divided into two or more mini-profiles. For example, for a given edge compute server, its corresponding mini-profiles can respectively represent components of the server, e.g., network mini-profile, CPU mini-profile, hard disk mini-profile, fan mini-profile, power supply mini-profile, BIOS mini-profile, etc. In additional illustrative embodiments, for a given profile, so long as a part of the profile associated with one component of the server is divided out, the remaining parts of the original profile can still be considered a mini-profile (also referred to as a sub-profile).

Step 303 (Stage-3): Mini-profiles are stored in a mini-profile (also referred to as a lightweight profile) library with appropriate tagging as will be further explained below.

Step 304 (Stage-4): Given the need for configuration of a new device coming online in the edge computing network or reconfiguration of an in-use device ("in-use" meaning a device that is already online), a profile analysis module using one or more AI/MI algorithms analyzes criteria such as an infrastructure common configuration (e.g., current hardware and software inventory), edge computing environment-specific requirements, and device telemetry information. The analysis module accesses the mini-profile library and, using some or all of the above-mentioned criteria, identifies mini-profiles (created in stages above) for components of the new or reconfigured device. The analysis module then creates a profile for the new or reconfigured device from the identified mini-profiles. As used here, device refers to any computing device (e.g., edge compute servers, edge devices, storage devices, network devices, etc.) being deployed in an edge computing network.

Thus, result 305 of step 304 is the creation of a best-fit profile for configuration/reconfiguration of each device. Alternatively, if a full profile for an existing device or a single mini-profile (created in stages above) is determined by the analysis module as a best-fit or match for the new device, the existing profile or single mini-profile is recommended as the profile for the device. It is to be understood that use of the term "best-fit" herein is intended to comprise optimal, sub-optimal and substantially optimal match since when an ideal profile selection cannot be identified, a sub-optimal or substantially optimal profile will be selected as the best fit.

Then, from the best-fit profiles (i.e., results 305) for the devices recited in the customer specification input in step 301, an edge topology diagram 306 that meets or exceeds the customer's specifications is constructed. Recall that, as explained above, edge topology diagram 306 is then provided to an edge topology deployment engine (e.g., 208) which then causes physical manifestation (e.g., actual deployment in the field) of edge computing network (e.g., 210) embodied by edge topology diagram 306. Existing deployment tools including, but not limited to, commercially-available edge deployment management tools (e.g., NativeEdge from Dell Technologies Inc.) and/or edge application deployment tools (e.g., Kubernetes orchestration platform) can be used as part of the edge topology deployment engine. Dell NativeEdge is an edge operations software platform that centralizes deployment and management of edge infrastructure and applications across geo-distributed locations. Dell NativeEdge helps enterprises securely scale their edge operations using automation, open design, zero-trust security principles, as well as multi-cloud connectivity. However, it is to be appreciated that alternative embodiments are not intended to be limited to any specific deployment tools for causing physical manifestation of edge topology diagram 306.

Figure 5:
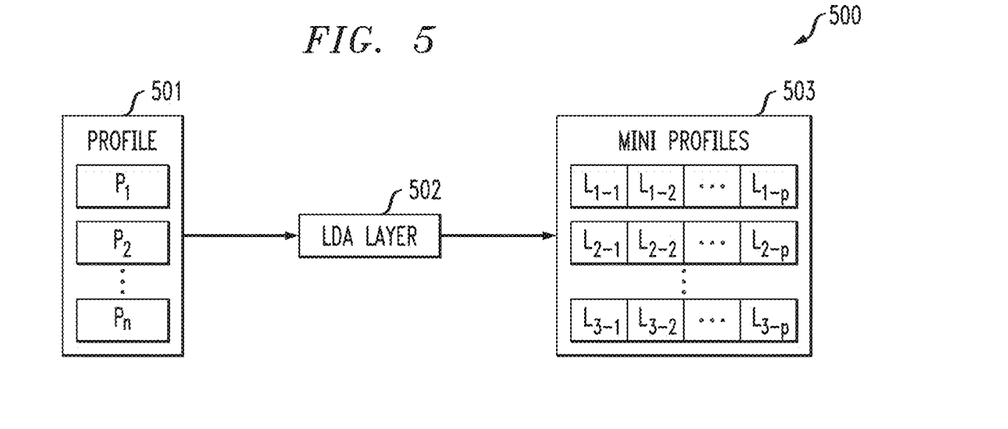
FIG. 5 illustrates a profile division stage of a multi-stage workflow for edge computing management according to an illustrative embodiment.

Stage-2 (step 302) will now be further illustratively described. More particularly, FIG. 5 depicts a profile division stage of a multi-stage methodology 500 for device configuration using profiling according to an illustrative embodiment. As shown, a set of profiles 501 ($P_1, P_2, \ldots, P_n$) associated with devices (e.g., servers) is input to an LDA layer module 502. LDA stands for Latent Dirichlet Allocation (LDA) which is an existing data processing technique that automatically discovers topics that a given data set contains. More specifically, LDA is a generative statistical model that allows sets of observations to be explained by unobserved groups that explain why some parts of the data are similar. For example, in terms of natural language processing, if observations are words collected into documents, an LDA model represents that each document is a mixture of a number of topics and that the presence of each word is attributable to one of the topics of the document. Thus, LDA tags a document with topic tags. LDA is also considered an AI/ML-based algorithm.

Accordingly, LDA layer module 502 uses LDA to divide each profile $P_1, P_2, \ldots, P_n$ in set of profiles 501 into sets of multiple mini-profiles 503 ($L_{1-1}, L_{1-2}, \ldots, L_{1-p}; L_{2-1}, L_{2-2}, \ldots, L_{2-p}; \ldots; L_{n-1}, L_{n-2}, \ldots, L_{n-p}$) based upon the components and configurations in each profile. More particularly, for each profile, LDA layer module 502 treats each component and its associated configuration details as a tagged topic, and divides the given profile ($P_1$) into tagged topics such that each component and its associated configuration details is a mini-profile ($L_{1-1}, L_{1-2}, \ldots, L_{1-p}$) of the given profile. Further details of the profile division stage (step 302) are described below in accordance with FIG. 6.

Figure 6:
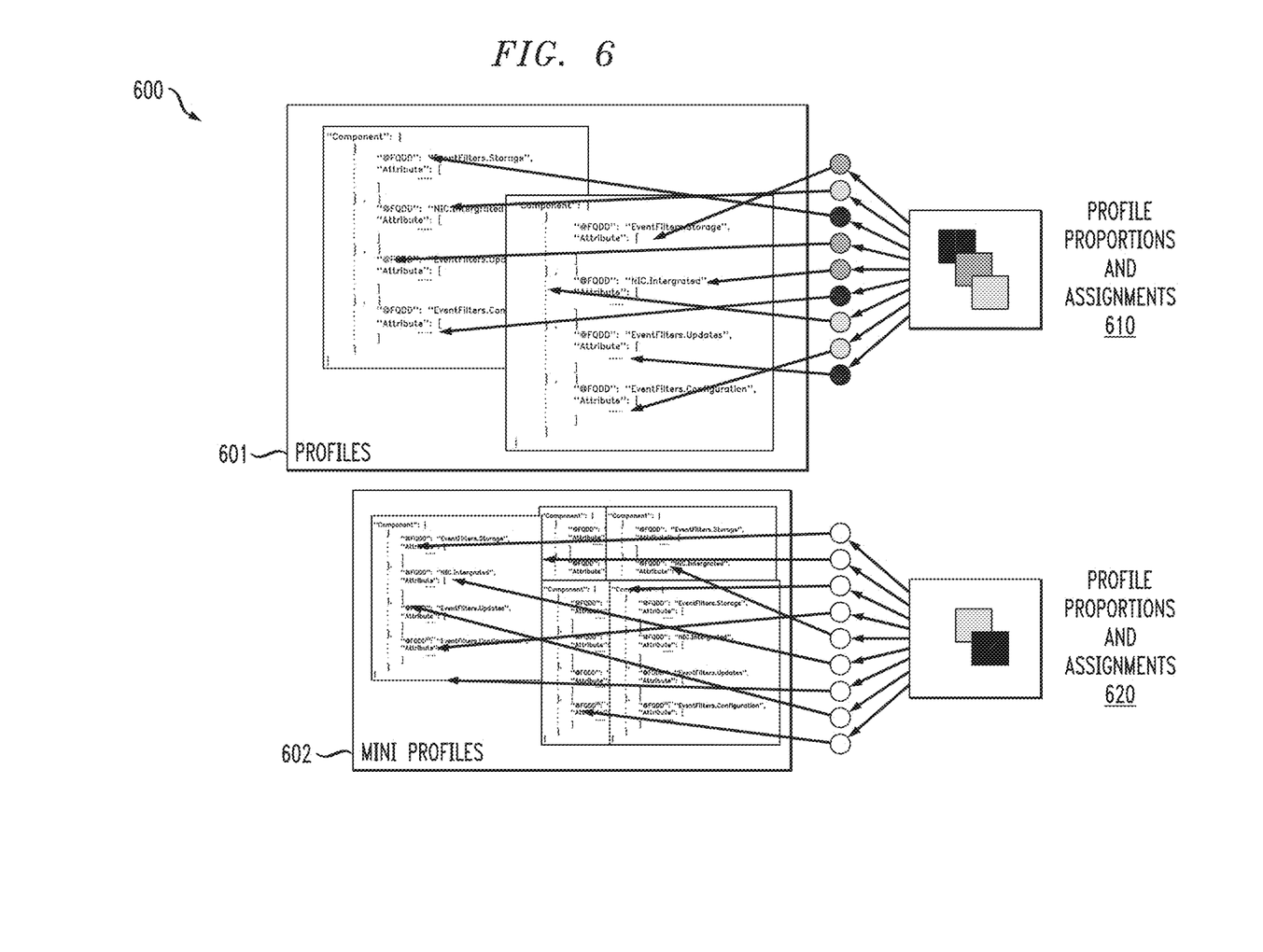
FIG. 6 further illustrates a profile division stage of a multi-stage workflow for edge computing management according to an illustrative embodiment.

FIG. 6 depicts further details 600 of a profile division stage of a multi-stage methodology for device configuration using profiling according to an illustrative embodiment. It is to be understood that, in accordance with illustrative embodiments, the further details described with reference to FIG. 6 are performed by LDA layer module 502 (FIG. 5). As shown, each profile in a set of profiles 601 is respectively divided into two or more mini-profiles and stored as sets of mini-profiles 602.

In some embodiments, each profile of the set of profiles 601 is a random mixture of components and each attribute is drawn from one of these components. Recall that an attribute is a configurable value associated with a given component. A component may have one or more such attributes.

The profile division stage in one or more illustrative embodiments comprises a generative process. In some embodiments, the generative process starts off with a distribution made over components that are present in a given profile. The distribution, denoted as profile proportions and assignments 610, is drawn from a Dirichlet distribution (i.e., via LDA layer module 502) where various grey shades reflect probabilities representing attributes. These attributes are then drawn from each distribution (mini-profiles 602), followed by attributes (network, storage, etc.) being mapped to the respective grey shades.

The profile division stage in one or more illustrative embodiments further comprises a posterior distribution process. Such distribution occurs on the latent variables (components and attributes of a given profile) upon conditional observations, that can be applied using the attributes of the available profile. The main objective is to extract the component structure from the available profile, that includes the generation of the different components from each profile and generating a distribution over them. Iteratively, each profile is selected and associated to the distribution over each component, and components are fetched from the respective profile to be mapped with the attributes, denoted as profile proportions and assignments 620.

Figure 7:
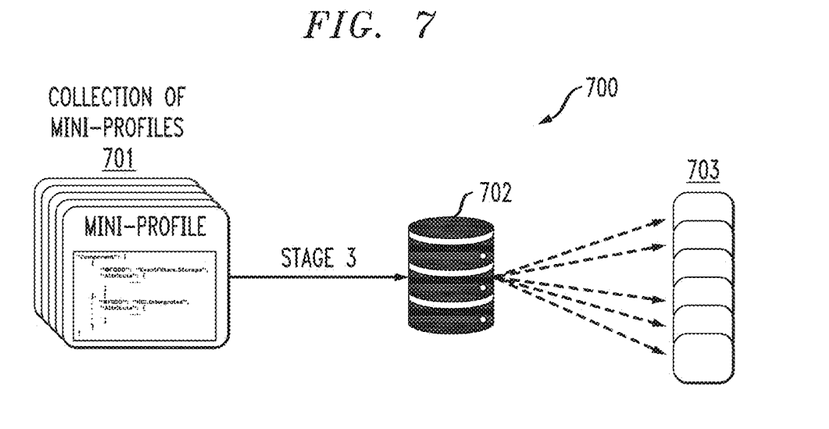
FIG. 7 illustrates a mini-profile library creation stage of a multi-stage workflow for edge computing management according to an illustrative embodiment.

Turning now to FIG. 7, a mini-profile library creation stage 700 of a multi-stage methodology for device configuration using profiling according to an illustrative embodiment is depicted. Recall from FIG. 3 that the mini-profile library creation stage is referred to as Stage-3 (step 303). In Stage-3, the mini-profiles 701 which are generated as the part of the output of Stage-2 are stored in a storage system 702 to form an accessible mini-profile library 703. Thus, since each profile is a combination of 'n' different components, each profile is divided into multiple logical and re-useable contextual-based mini-profiles available in mini-profile library 703. As will be further explained below in Stage-4, mini-profiles can be combined to address the configuration of new devices and/or reconfigured devices.

Figure 8:
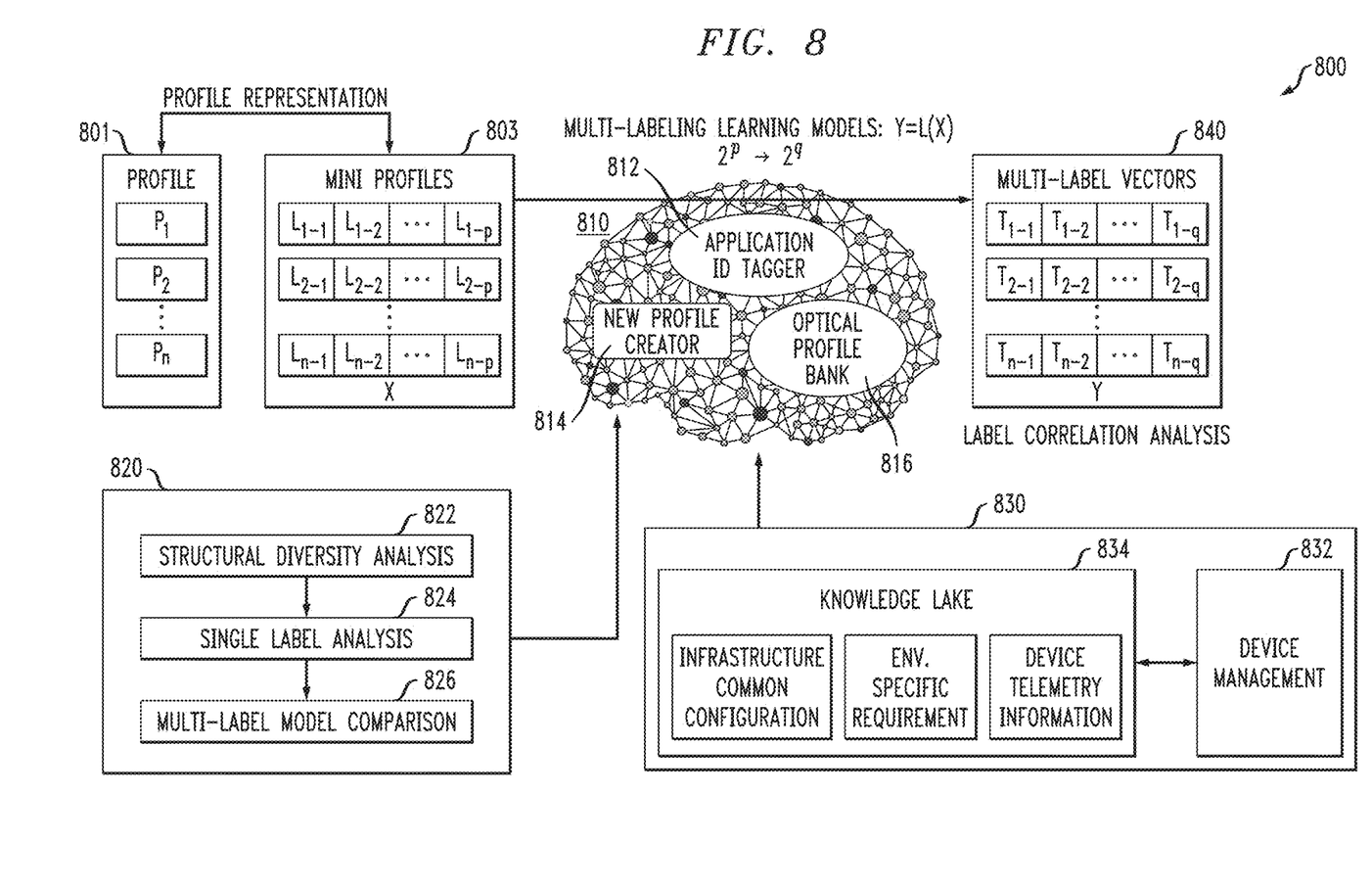
FIG. 8 illustrates an artificial intelligence-based analysis stage of a workflow for edge computing management according to an illustrative embodiment.

FIG. 8 depicts an artificial intelligence-based analysis stage 800 of a multi-stage methodology for device configuration using profiling according to an illustrative embodiment. Recall from FIG. 3 that the artificial intelligence-based analysis stage is referred to as Stage-4 (step 304). As shown, a set of profiles 801 are divided into a set of mini-profiles 803, for example, as described herein in accordance with Stage-2. The set of mini-profiles 803 are accessible from a profile library (e.g., mini-profile library 703 created in Stage-3). Also shown, an optimal profile analysis module (OPAM) 810, which functions as a centralized artificial intelligence system, comprises an application identifier (ID) tagger module 812, a new profile creator module 814 and an optimal profile bank 816. OPAM 810 starts by accessing the set of mini-profiles 803. In an alternative embodiment, the conversion of available profiles into a set of mini-profiles can be implemented as part of OPAM 810. To predict the best-fit profile match for a given device, OPAM 810 utilizes two sets of inputs 820 and 830. Input 820 comprises data from a structural diversity analysis 822, a single label analysis 824 and a multi-label model comparison 826. Input 830 comprises data from a device management tool (e.g., Support Assist Enterprise or SAE) 832 including current hardware and software inventory and data from a knowledge lake 834 including infrastructure common configuration, environment specific requirements and device telemetry information. Using inputs 820 and 830, OPAM 810 generates a set of multi-label vectors 840 ($T_{1-1}$, $T_{1-2}$, ..., $T_{1-q}$; $T_{2-1}$, $T_{2-2}$, ..., $T_{2-q}$; $T_{n-1}$, $T_{n-2}$, ..., $T_{n-q}$) using a multi-label learning model: $Y=L(X)$ where X represents the set of mini-profiles 803 and Y represents the set of multi-label vectors 840. The set of multi-label vectors 840 provides the recommendation for the best-fit profile (e.g., an existing profile from set of profiles 801 or a new profile which is a combination of two or more mini-profiles from set of mini-profiles 803) for any enterprise device. It is to be appreciated that the various analyses in input 820 and the label correlation analysis that results in the multi-label vectors 840 can be performed in one or more illustrative embodiments by a conventional multi-label classification algorithm such as, but not limited to, A. Yanpi and M. Taheri, "A Large-Margin Approach for Multi-Label Classification Based on Correlation Between Labels," 5th Conference on Knowledge Based Engineering and Innovation (KBEI), pp. 713-716, 2019, the disclosure of which is incorporated herein by reference in its entirety.

More particularly, application ID tagger module 812 analyzes the set of mini-profiles 803 and tags each sub-profile with a relevant application ID. Further, one or more sub-profiles that are commonly used can be designated as generic profiles. Device management tool 832 provides the current hardware and software details which are used to identify the relevant application labeled in the mini-profiles in order to form an optimal configuration profile. Application specific requirements in knowledge lake 834 include a list of features to be enabled for applications. This module is extensible and new learning by the algorithm is added to this module. Infrastructure common configurations in knowledge lake 834 include the data center specific information such as data center name, device asset name, user credentials, etc.

Further, optimal profile bank 816 stores the existing optimal (best-fit) profiles along with a system inventory. When a similar hardware configuration request for a profile is made, the profile is provided from the optimal profile bank 816. Still further, new profile creator module 814 is responsible for creating a new profile based on the telemetry data collected from the respective device. Post analysis, a requirement map of the components is generated using the mini-profile library, and a customized profile is created for the respective device. This newly generated profile is, for example, a blend of mini-profiles. The newly created profile is stored in the optimal profile bank 816 for future similar requests.

Advantageously, as described herein in one or more illustrative embodiments, a method is provided that breaks full profiles into smaller logical sub-profiles (e.g., mini-profiles) which can also act as a reusable mini-profiles. The mini-profiles themselves can be further broken down into smaller logical sub-profiles. In other illustrative embodiments, a method is provided that selects a most appropriate profile (contextual match) for a given device using a process that correlates criteria such as current device state, one or more applications installed, and upcoming requirements for the device. In yet other illustrative embodiments, a method is provided that generates a new customized run-time profile for a given device by combining multiple mini-profiles using an optimal profile analysis module. From the best-fit profiles of devices referenced in a customer specification, a topology diagram is constructed for subsequent implementation by a deployment engine as explained herein.

Figure 9:
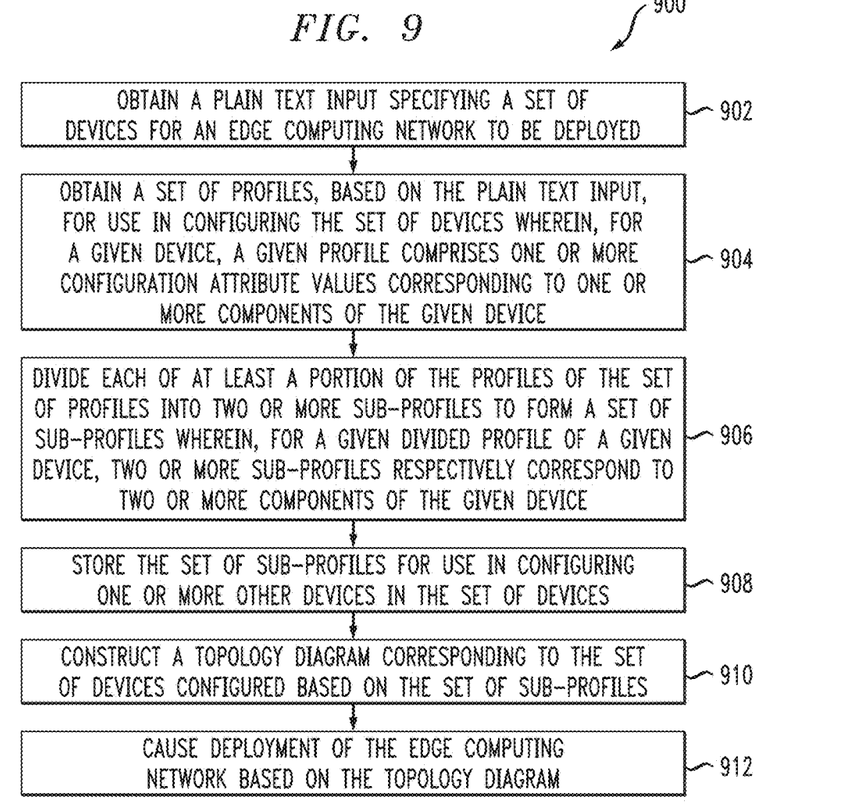
FIG. 9 illustrates an edge computing environment management methodology according to an illustrative embodiment.

FIG. 9 depicts a methodology 900 for edge computing management according to an illustrative embodiment. Step 902 obtains a plain text input specifying a set of devices for an edge computing network to be deployed. Step 904 obtains a set of profiles, based on the plain text input, for use in configuring the set of devices wherein, for a given device, a given profile comprises one or more configuration attribute values corresponding to one or more components of the given device. Step 906 divides each of at least a portion of the profiles of the set of profiles into two or more sub-profiles to form a set of sub-profiles wherein, for a given divided profile of a given device, two or more sub-profiles respectively correspond to two or more components of the given device. Step 908 stores the set of sub-profiles for use in configuring one or more other devices in the set of devices. Step 910 constructs a topology diagram corresponding to the set of devices configured based on the set of sub-profiles. Step 912 causes deployment of the edge computing network based on the topology diagram.

Figure 10:
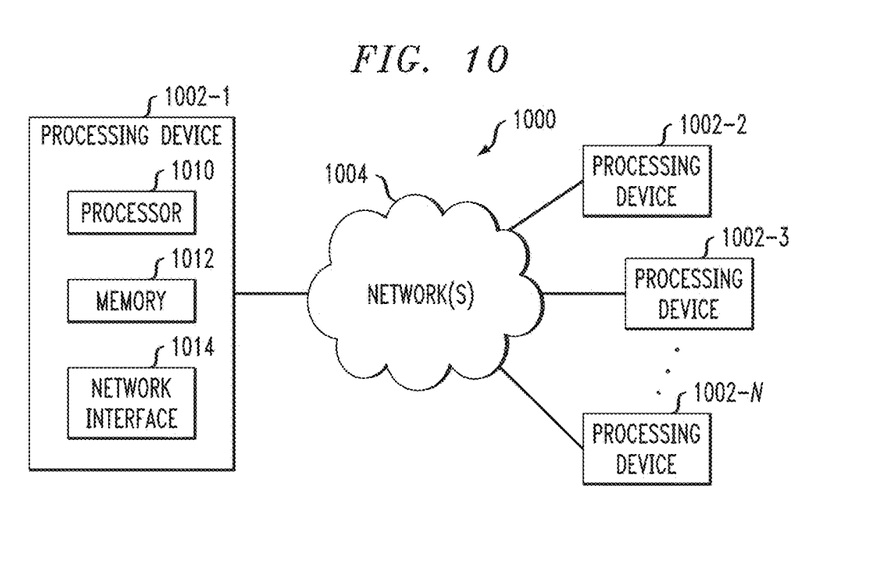
FIG. 10 illustrates a processing platform for implementing an edge computing environment management methodology according to an illustrative embodiment.

FIG. 10 depicts a processing platform 1000 used to implement edge computing management according to an illustrative embodiment. More particularly, processing platform 1000 is a processing platform on which a computing environment with functionalities described herein (e.g., FIGS. 1-9 and otherwise described herein) can be implemented.

The processing platform 1000 in this embodiment comprises a plurality of processing devices, denoted 1002-1, 1002-2, 1002-3, . . . 1002-N, which communicate with one another over network(s) 1004. It is to be appreciated that the methodologies described herein may be executed in one such processing device 1002, or executed in a distributed manner across two or more such processing devices 1002. It is to be further appreciated that a server, a client device, a computing device or any other processing platform element may be viewed as an example of what is more generally referred to herein as a "processing device." As illustrated in FIG. 10, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 1002 shown in FIG. 10. The network(s) 1004 represent one or more communications networks that enable components to communicate and to transfer data therebetween, as well as to perform other functionalities described herein.

The processing device 1002-1 in the processing platform 1000 comprises a processor 1010 coupled to a memory 1012. The processor 1010 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1010. Memory 1012 (or other storage device) having such program code embodied therein is an example of what is more generally referred to herein as a processor-readable storage medium. Articles of manufacture comprising such computer-readable or processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1012 may comprise electronic memory such as random-access memory (RAM), read-only memory (ROM) or other types of memory, in any combination. The one or more software programs when executed by a processing device such as the processing device 1002-1 causes the device to perform functions associated with one or more of the components/steps of system/methodologies in FIGS. 1-9. One skilled in the art would be readily able to implement such software given the teachings provided herein. Other examples of processor-readable storage media embodying embodiments of the invention may include, for example, optical or magnetic disks.

Processing device 1002-1 also includes network interface circuitry 1014, which is used to interface the device with the networks 1004 and other system components. Such circuitry may comprise conventional transceivers of a type well known in the art.

The other processing devices 1002 (1002-2, 1002-3, . . . 1002-N) of the processing platform 1000 are assumed to be configured in a manner similar to that shown for computing device 1002-1 in the figure.

The processing platform 1000 shown in FIG. 10 may comprise additional known components such as batch processing systems, parallel processing systems, physical machines, virtual machines, virtual switches, storage volumes, etc. Again, the particular processing platform shown in this figure is presented by way of example only, and the system shown as 1000 in FIG. 10 may include additional or alternative processing platforms, as well as numerous distinct processing platforms in any combination.

Also, numerous other arrangements of servers, clients, computers, storage devices or other components are possible in processing platform 1000. Such components can communicate with other elements of the processing platform 1000 over any type of network, such as a wide area network (WAN), a local area network (LAN), a satellite network, a telephone or cable network, or various portions or combinations of these and other types of networks.

Furthermore, it is to be appreciated that the processing platform 1000 of FIG. 10 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 1000 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1-10 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention.

What is claimed is:

1. An apparatus comprising:
a processing platform comprising at least one processor coupled to at least one memory, the processing platform configured to:
obtain a plain text input specifying a set of devices for an edge computing network to be deployed;
obtain a set of profiles, based on the plain text input, for use in configuring the set of devices wherein, for a given device, a given profile comprises one or more configuration attribute values corresponding to one or more components of the given device;
divide each of at least a portion of the profiles of the set of profiles into two or more sub-profiles to form a set of sub-profiles wherein, for a given divided profile of a given device, two or more sub-profiles respectively correspond to two or more components of the given device;
store the set of sub-profiles for use in configuring one or more other devices in the set of devices;
construct a topology diagram corresponding to the set of devices configured based on the set of sub-profiles; and
cause deployment of the edge computing network based on the topology diagram.

2. The apparatus of claim 1, wherein the processing platform is further configured to:
analyze at least a portion of the set of sub-profiles;
identify one or more sub-profiles from the set of sub-profiles that are a match for the one or more other devices based on the analysis; and
form one or more profiles for the one or more other devices from the one or more identified sub-profiles.

3. The apparatus of claim 2, wherein the processing platform is further configured to:
identify one or more profiles from the set of profiles based on the analysis; and
form one or more profiles for the one or more other devices from the one or more identified profiles.

4. The apparatus of claim 3, wherein the processing platform is further configured to:
configure the one or more other devices using the one or more profiles formed from the one or more identified sub-profiles or the one or more identified profiles.

5. The apparatus of claim 2, wherein the processing platform is further configured to:
identify the one or more sub-profiles from the set of sub-profiles that are a match for the one or more other devices based on a multi-label classification operation that correlates two or more of a current device state, one or more applications installed on the device, and one or more anticipated device requirements.

6. The apparatus of claim 5, wherein the multi-label classification operation comprises one or more artificial intelligence-based algorithms.

7. The apparatus of claim 1, wherein the processing platform is further configured to:
divide each of at least a portion of the profiles of the set of profiles into two or more sub-profiles to form the set of sub-profiles using a topic tagging operation wherein, for a given profile, each component and its one or more configuration attribute values is tagged as a topic, and the given profile is divided into tagged topics such that each component and its one or more configuration attribute values becomes part of a given mini-profile of the given profile.

8. A method performed by a processing platform, comprising:
obtaining a plain text input specifying a set of devices for an edge computing network to be deployed;
obtaining a set of profiles, based on the plain text input, for use in configuring the set of devices wherein, for a given device, a given profile comprises one or more configuration attribute values corresponding to one or more components of the given device;
dividing each of at least a portion of the profiles of the set of profiles into two or more sub-profiles to form a set of sub-profiles wherein, for a given divided profile of a given device, two or more sub-profiles respectively correspond to two or more components of the given device;
storing the set of sub-profiles for use in configuring one or more other devices in the set of devices;
constructing a topology diagram corresponding to the set of devices configured based on the set of sub-profiles; and
causing deployment of the edge computing network based on the topology diagram;
wherein the processing platform comprises at least one processor coupled to at least one memory.

9. The method of claim 8, further comprising:
analyzing at least a portion of the set of sub-profiles;
identifying one or more sub-profiles from the set of sub-profiles that are a match for the one or more other devices based on the analysis; and
forming one or more profiles for the one or more other devices from the one or more identified sub-profiles.

10. The method of claim 9, further comprising:
identifying one or more profiles from the set of profiles based on the analysis; and
forming one or more profiles for the one or more other devices from the one or more identified profiles.

11. The method of claim 10, further comprising:
configuring the one or more other devices using the one or more profiles formed from the one or more identified sub-profiles or the one or more identified profiles.

12. The method of claim 9, further comprising:
identifying the one or more sub-profiles from the set of sub-profiles that are a match for the one or more other devices based on a multi-label classification operation that correlates two or more of a current device state, one or more applications installed on the device, and one or more anticipated device requirements.

13. The method of claim 12, wherein the multi-label classification operation comprises one or more artificial intelligence-based algorithms.

14. The method of claim 8, further comprising:
dividing each of at least a portion of the profiles of the set of profiles into two or more sub-profiles to form the set of sub-profiles using a topic tagging operation wherein, for a given profile, each component and its one or more configuration attribute values is tagged as a topic, and the given profile is divided into tagged topics such that each component and its one or more configuration attribute values becomes part of a given mini-profile of the given profile.

15. A computer program product comprising a non-transitory processor-readable storage medium having stored therein program code of one or more software programs, wherein the program code, when executed by a processing platform comprising at least one processor coupled to at least one memory, causes the processing platform to:
obtain a plain text input specifying a set of devices for an edge computing network to be deployed;
obtain a set of profiles, based on the plain text input, for use in configuring the set of devices wherein, for a given device, a given profile comprises one or more configuration attribute values corresponding to one or more components of the given device;
divide each of at least a portion of the profiles of the set of profiles into two or more sub-profiles to form a set of sub-profiles wherein, for a given divided profile of a given device, two or more sub-profiles respectively correspond to two or more components of the given device;
store the set of sub-profiles for use in configuring one or more other devices in the set of devices;
construct a topology diagram corresponding to the set of devices configured based on the set of sub-profiles; and cause deployment of the edge computing network based on the topology diagram.

16. The computer program product of claim 15, wherein the processing platform is further caused to:
analyze at least a portion of the set of sub-profiles;
identify one or more sub-profiles from the set of sub-profiles that are a match for the one or more other devices based on the analysis; and
form one or more profiles for the one or more other devices from the one or more identified sub-profiles.

17. The computer program product of claim 16, wherein the processing platform is further caused to:
identify one or more profiles from the set of profiles based on the analysis; and
form one or more profiles for the one or more other devices from the one or more identified profiles.

18. The computer program product of claim 17, wherein the processing platform is further caused to:
configure the one or more other devices using the one or more profiles formed from the one or more identified sub-profiles or the one or more identified profiles.

19. The computer program product of claim 16, wherein the processing platform is further caused to:
identify the one or more sub-profiles from the set of sub-profiles that are a match for the one or more other devices based on a multi-label classification operation that correlates two or more of a current device state, one or more applications installed on the device, and one or more anticipated device requirements.

20. The computer program product of claim 15, wherein the processing platform is further caused to:
divide each of at least a portion of the profiles of the set of profiles into two or more sub-profiles to form the set of sub-profiles using a topic tagging operation wherein, for a given profile, each component and its one or more configuration attribute values is tagged as a topic, and the given profile is divided into tagged topics such that each component and its one or more configuration attribute values becomes part of a given mini-profile of the given profile.

* * * * *